United States Patent [19]

Bridges

[11] Patent Number: 6,075,549

[45] Date of Patent: *Jun. 13, 2000

[54] LENS ADJUSTMENT ASSEMBLY FOR ELECTRONIC DIGITAL IMAGING APPARATUS

[75] Inventor: Mark E. Bridges, Spencerport, N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/418,732

[22] Filed: Apr. 7, 1995

[51] Int. Cl.[7] .............................. B41J 2/47; G01D 15/34; G02B 26/00; G02B 27/00
[52] U.S. Cl. ............................................................. 347/257
[58] Field of Search .................................. 347/263, 245, 347/239, 255, 225, 257

[56] References Cited

U.S. PATENT DOCUMENTS 4,479,133  10/1984  Shiozawa et al. .
4,913,527   4/1990  Jessop .
5,177,502   1/1993  Schreyer et al. .

Primary Examiner—John Barlow
Assistant Examiner—Raquel Yvette Gordon
Attorney, Agent, or Firm—Walter S. Stevens

[57] ABSTRACT

An electronic digital imaging apparatus includes an intensity-modulated light source for emitting a light beam along an optical path, an adjustment block to which the light source is fixed and which is movable along the optical path to move the light source along the optical path, and means for scanning the light beam along a recording surface. The adjustment block has two opposed ends and a central region; one of the opposed ends being fixed relative to the optical path, the other of the opposed ends being adjustable in the general direction of the optical path, and the central region carries the light source; whereby adjustment of the other of the opposed ends in the general direction of the optical path by a given distance is effective to move the light source along the optical path by a fraction of the given distance. Projection optics are detachably integral with the light source in the optical path for focusing the light beam at the recording surface. The projection optics being detachable from the light source without effecting the position of the light source along the optical path so as to not disturb the focus of the imaging apparatus upon re-attachment of the projection optics to the light source.

13 Claims, 5 Drawing Sheets

LENS ADJUSTMENT ASSEMBLY FOR ELECTRONIC DIGITAL IMAGING APPARATUS

CROSS-REFERENCE TO RELATED APPLICATIONS

Reference is made to commonly assigned, co-pending U.S. Pat. No. 5,392,662 and Ser. No. 08/371,241, entitled DIGITAL PRINTER WITH SUPPORT SHOE AND TRANSLATABLE MEDIA GUIDE MEMBER THEREIN filed in the name of M. Bridges on Jan. 11, 1995.

BACKGROUND OF THE INVENTION

1. Technical Field

This invention relates generally to the field of electronic digital imaging and, specifically, to such imaging systems that utilize a light source write head to record information by scanning photosensitive media.

2. Background Art

Electronic digital imaging, such as for example in copiers and/or printers, is accomplished by modulating the intensity of a light beam that forms a writing spot on photosensitive media as the beam moves relative to the photosensitive media. One type of electronic digital imager uses a modulated array of light emitting diodes (LED's) positioned on a write head assembly resident on a rotor which is simultaneously rotated about a fixed axis and linearly translated past stationary photosensitive recording media mounted on the inner surface of a cylindrical "support shoe" to form a plurality of writing spots moving across the photosensitive material in a fast scan direction and in a slow scan direction, such as disclosed in commonly assigned, co-pending U.S. patent application Ser. No. 08/371,241, entitled DIGITAL PRINTER WITH SUPPORT SHOE AND TRANSLATABLE MEDIA GUIDE MEMBER THEREIN filed in the name of M. Bridges on Jan. 11, 1995. The disclosure of the Bridges patent application is hereby specifically incorporated herein by reference.

Imagers such as disclosed in the Bridges application must be factory-focused onto the predicted medial surface. It may be desirable from time-to-time to adjust the focus of the optical system such as to accommodate media of different thicknesses. Projection optics that can be re-focused relative to the media support enable the use of photosensitive media of multiple thicknesses while using the same lens assembly.

When using imagers such as disclosed in the Bridges and the Kiesow applications, the optics must remain focused under high rotational gravitational forces, and yet be easily re-focused in the field. Dismounting the lens during LED array changes causes a loss of focus, so provision must also be made for easy and repeatable replacement of the LED array. The optical elements must be light weight to minimize inertia because they are mounted on a spinning rotor.

DISCLOSURE OF THE INVENTION

It is an object of the present invention to provide an improved lens adjustment assembly that can be easily focused onto the predicted media surface, both in the factory during final assembly and in the field.

It is another object of the present invention to provide an improved lens adjustment assembly that is light in weight and low in inertia so that the rotor motor requirements are small, large size component use is minimized, and the rotor reaches operating speed quickly.

It is still another object of the present invention to provide an improved lens adjustment assembly that is sufficiently rigid to maintain focus at high speeds.

It is yet another object of the present invention to provide an improved lens adjustment assembly that maintains lens focal length adjustment during LED array replacement. Preferably, this is accomplished by independent removal of the lens and LED array, resulting in no loss of lens focus adjustment when the LED array is removed.

Other objects of the present invention include having only a very few tight-tolerance parts, and an assembly with good heat dissipation properties.

According to a feature of the present invention, an electronic digital imaging apparatus includes an intensity-modulated light source for emitting a light beam along an optical path, an adjustment block to which the light source is fixed and which is movable along the optical path to move the light source along the optical path, and means for scanning the light beam along a recording surface.

According to another feature of the present invention, the adjustment block has two opposed ends and a central region; one of the opposed ends being fixed relative to the optical path, the other of the opposed ends being adjustable in the general direction of the optical path, and the central region carries the light source, whereby adjustment of the other of the opposed ends in the general direction of the optical path by a given distance is effective to move the light source along the optical path by a fraction of the given distance. In a preferred embodiment, adjustment of the other of the opposed ends by a given distance is effective to move the light source by approximately one-half of the given distance.

According to yet another feature of the present invention, the adjustment block is a pantograph linkage comprising a first arm forming the one of the opposed ends of the adjustment block, a second arm forming the other of the opposed ends of the adjustment block, and a third arm forming the central region of the adjustment block; the three arms being flexibly connected to top and bottom links, whereby adjustment of the second arm in the general direction of the optical path by a given distance is effective to move the third arm along the optical path by a fraction of the given distance.

According to still another feature of the present invention projection optics are detachably integral with the light source in the optical path for focusing the light beam at the recording surface. The projection optics being detachable from the light source without effecting the position of the light source along the optical path so as to not disturb the focus of the imaging apparatus upon re-attachment of the projection optics to the light source.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art. It is also to be understood that the lens adjustment assembly of the present invention has applications in types of imaging apparatus other than the rotary printer of the illustrated preferred embodiment. For example, the light weight of the assembly may lend itself particularly to a moving structure, but the invention would also be applicable to a stationary assembly with scanning optics such as for example a rotating polygon mirror.

Figure 1:
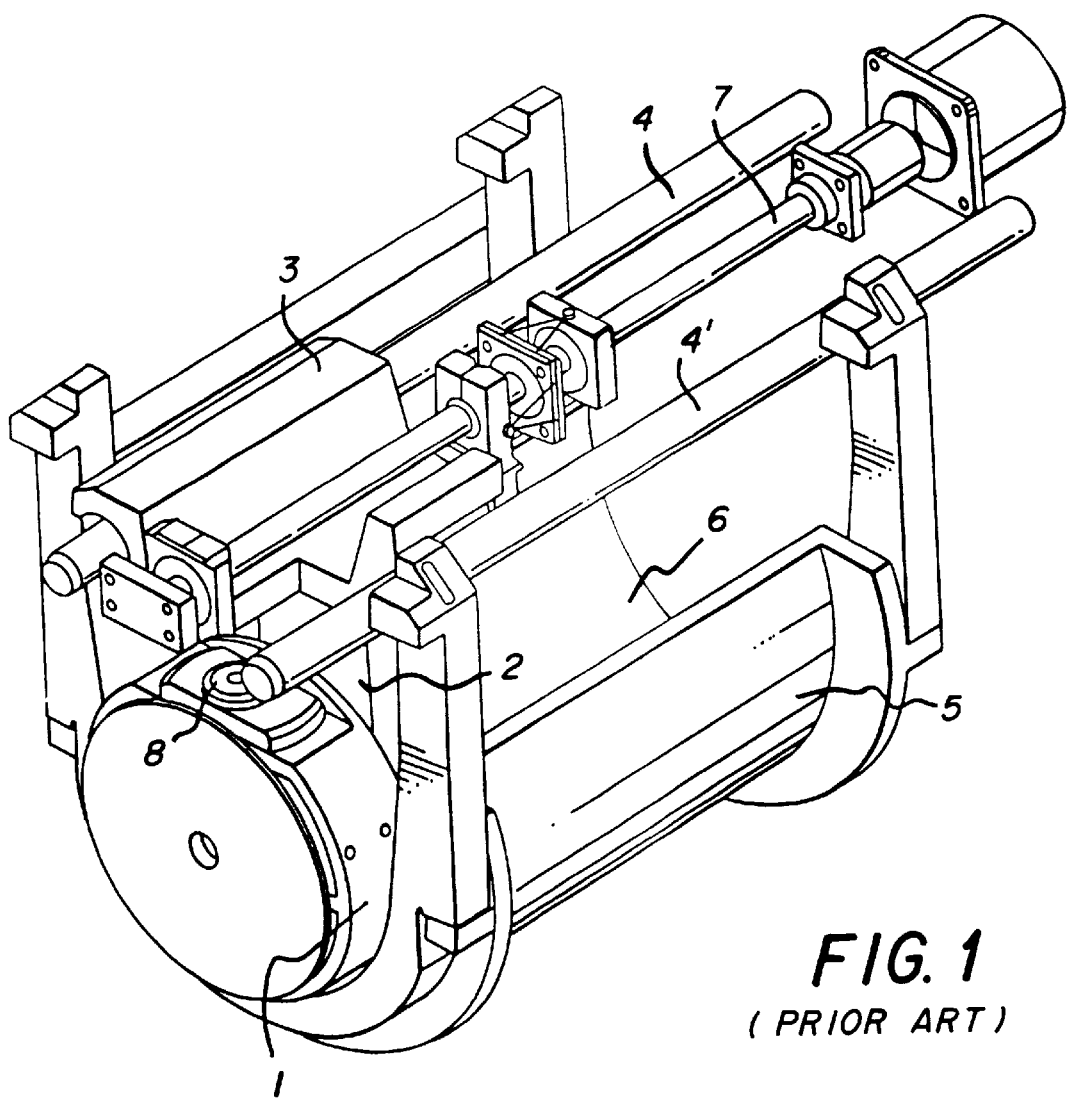
FIG. 1 a perspective view of a rotary printing system according to the prior art.

A prior art rotary printing system employing an adjustable-position lens assembly is illustrated in FIG. 1, and includes a rotor 1 coupled to a drive motor, not shown, supported by a rotor support member 2 which hangs from a carriage assembly 3 which is supported for movement along a pair of guide rods 4 and 4'. The rotor is arranged to spin and move axially within a cylindrical support shoe 5 which is adapted to receive a sheet of photosensitive material on the inner surface 6 thereof. Rotor 1 is attached to a linear translation assembly comprising rotor support member 2, carriage assembly 3, and a lead screw 7 driven by a stepper motor. See commonly assigned, U.S. Pat. No. 5,392,662 entitled LEADSCREW COUPLER, issued in the names of Jadrich et al. on Feb. 20, 1995. The disclosure of the Jadrich et al. patent is hereby specifically incorporated herein by reference. The rotor is simultaneously rotated by the drive motor in a fast scan direction and is translated past the cylindrical support shoe in the slow scan direction (axially) by the stepper motor and lead screw 7, thereby achieving a raster scan pattern on the photosensitive media held within the support shoe.

An LED printhead assembly 8 is mounted in rotor 1 and comprises a plurality of mono-color light sources such as an array of LED's and a projection lens assembly. The printhead assembly is located within the body of rotor 1 with the LED array package positioned so that the LED aperture output surface is located in a plane which is perpendicular to the optical axis of the projection lens assembly. The projection lens assembly is arranged to simultaneously image (focus) all of the LED's in the array onto a surface located in close proximity above the outer surface of the rotor, and more particularly, onto the inner surface of the photosensitive material held by support shoe 5. A single projection lens array thereby images the plurality of LED's onto the photosensitive material as a plurality of individual images which constitute the writing beams that expose the image pixels.

Figure 2:
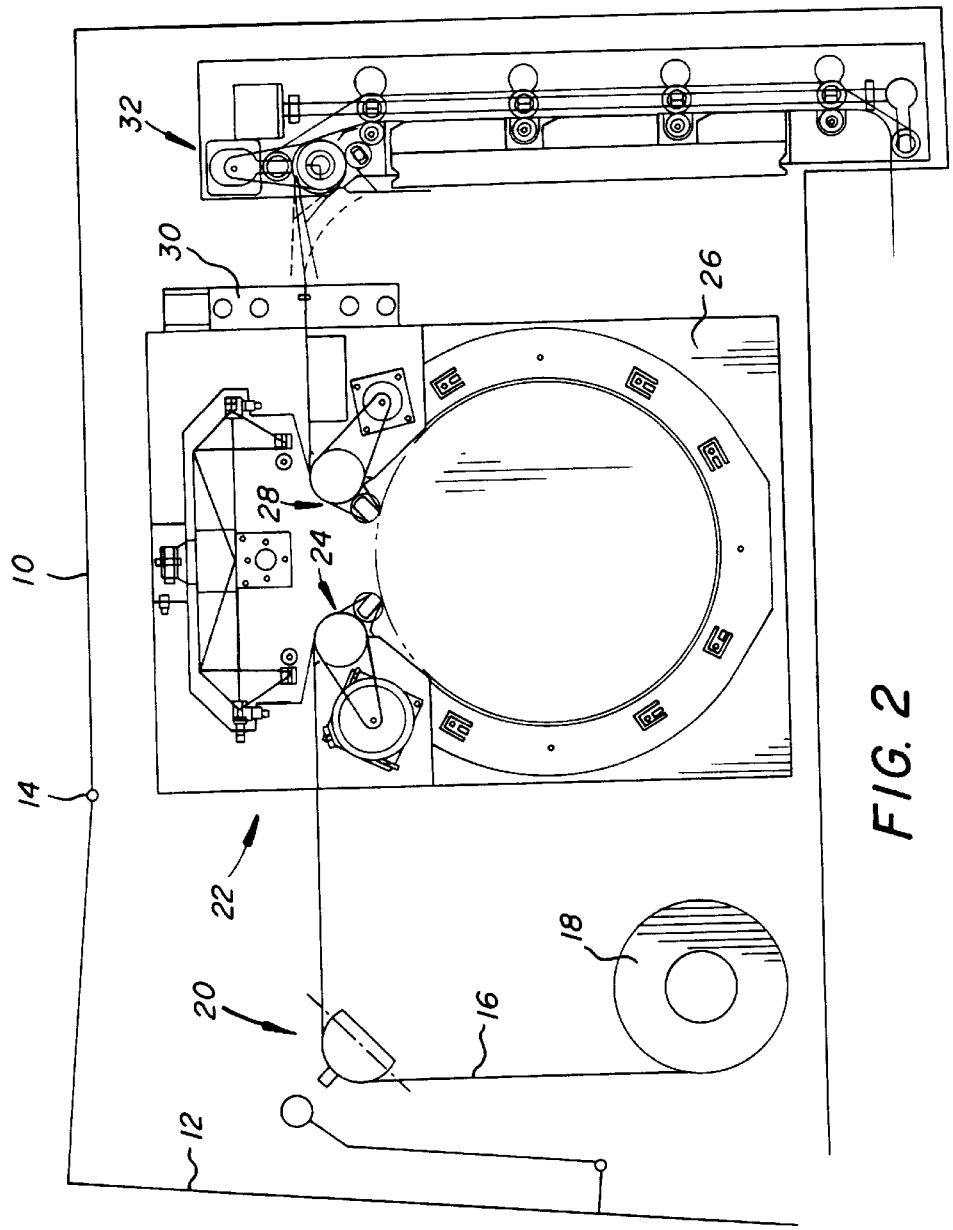
FIG. 2 is a schematic illustration of a printer incorporating a preferred embodiment of the present invention.

FIG. 2 is a schematic illustration of a printer incorporating a preferred embodiment of the present invention. Access into a light-tight cabinet 10 is attained through a door 12, which pivots about a hinge 14. A web of photographic light sensitive media 16 is fed from a roll 18 around an anti-backup device 20.

From anti-backup device 20, paper is lead to a write station 22 which is disclosed in detail in the above-mentioned U.S. patent application entitled DIGITAL PRINTER WITH SUPPORT SHOE AND TRANSLATABLE MEDIA GUIDE MEMBER THEREIN. Briefly, however, the write station includes a metering mechanism 24, a cylindrical support shoe 26 (corresponding to support shoe 5 in the prior art device of FIG. 1), an exit guide 28, a web-cutting mechanism 30 including a pair of knives, and an exit media guide member.

Figure 3:
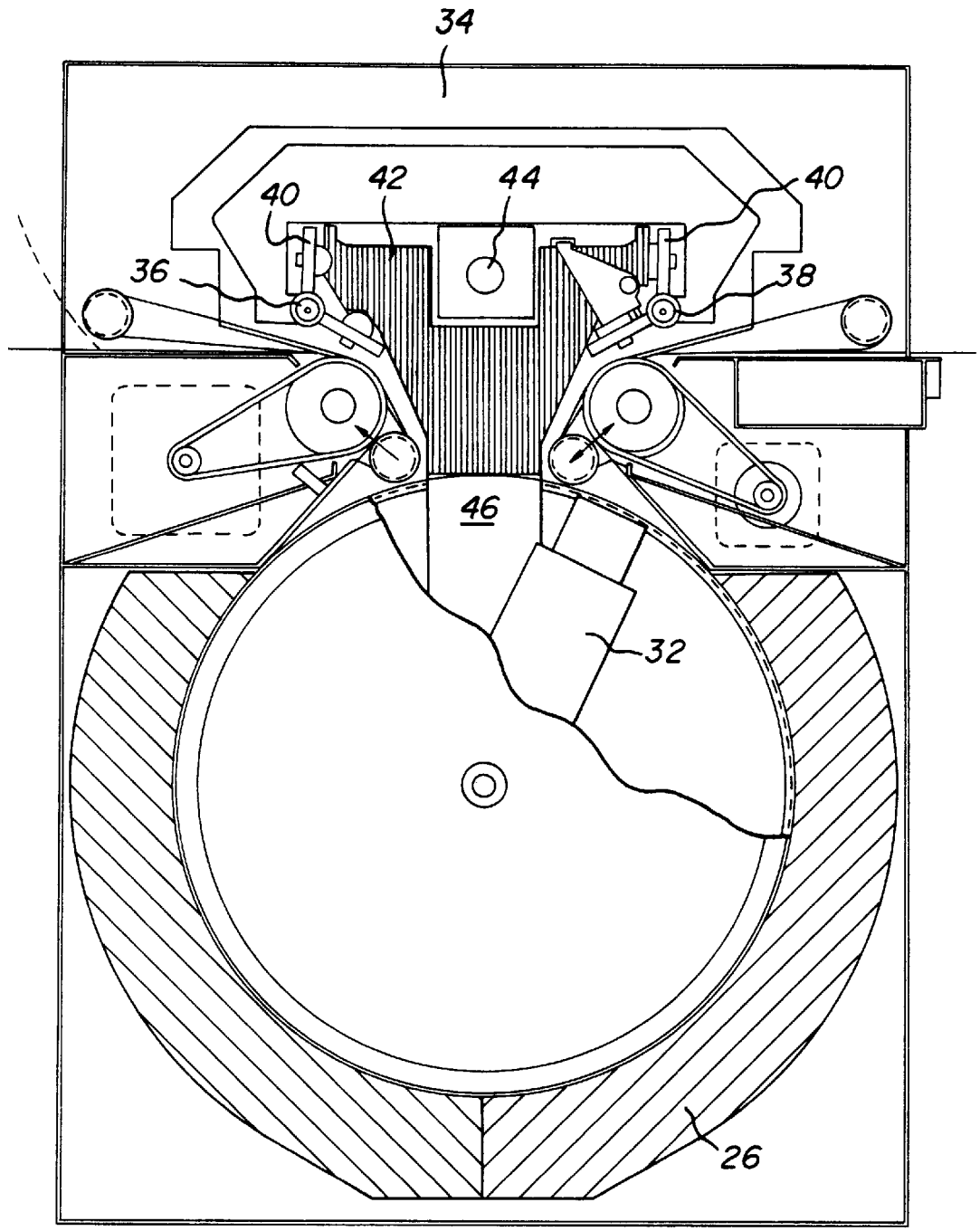
FIG. 3 is an enlarged view of a portion of the printer of FIG. 2.

Referring now to FIG. 3, the arcuate inner surface of cylindrical support shoe 26 is precisely bored so that an LED array in a lens assembly 31 mounted on a rotor 32 focuses on the emulsion side of media 16. A translator base assembly 34 is attached to framework to support guide rods 36 and 38. A plurality of wheels 40 are rotatably attached to a carriage 42 which translates along guide rods 36 and 38 by means of a lead screw 44 turned by a lead screw motor, not shown. See afore-mentioned U.S. Pat. No. 5,392,662 entitled LEADSCREW COUPLER. A rotor support member 46 (corresponding to rotor support member 2 in the prior art device of FIG. 1) is rigidly attached to carriage 42, and carries rotor 32. Also attached to rotor support member 46 is a media guide disc 48 arranged such that a space gap is created between the outer diameter of the media guide disc and the arcuate inner surface of support shoe 26.

Figure 4:
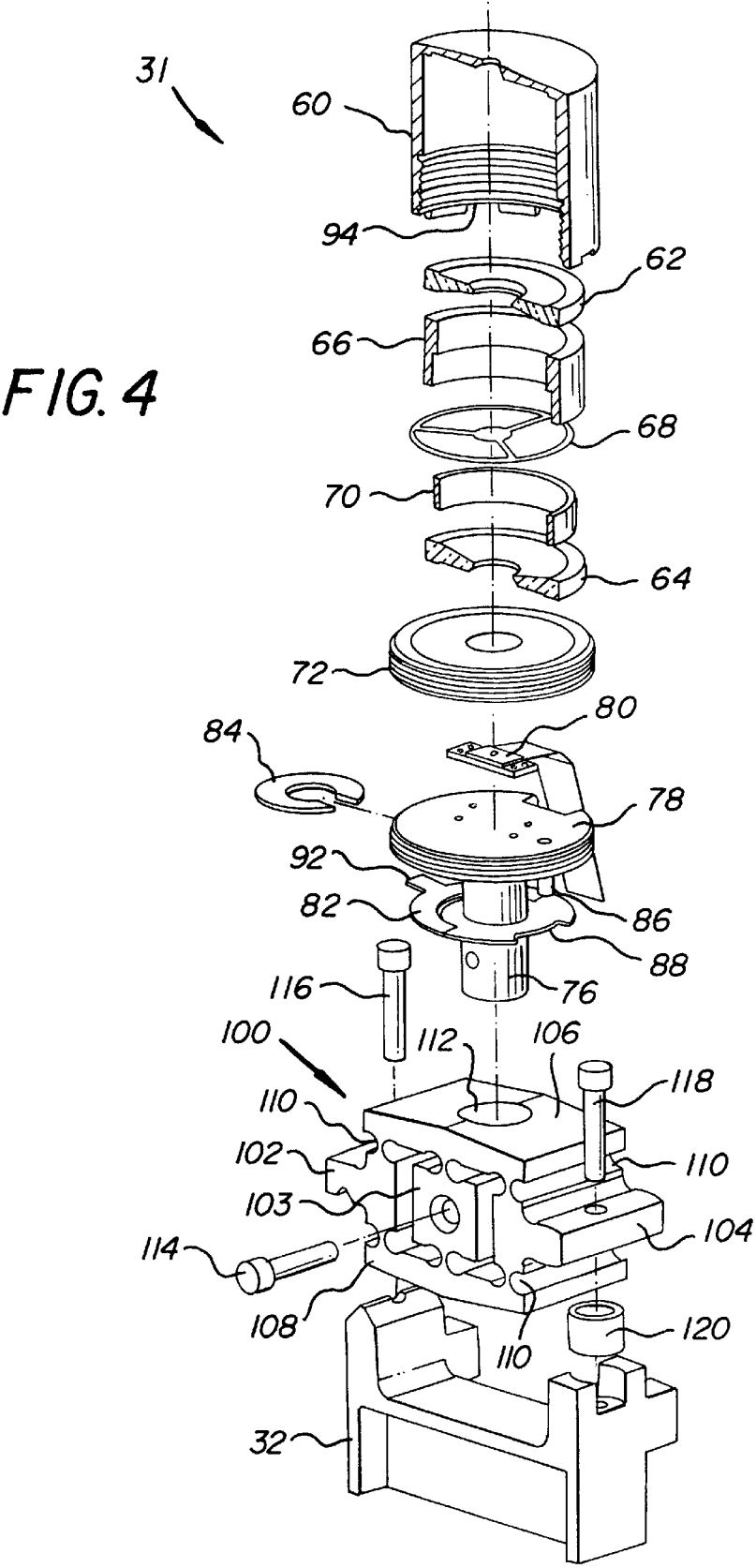
FIG. 4 is an exploded view of the lens adjustment assembly with the optical elements shown in section for clarity according to a preferred embodiment of the present invention.
Figure 5:
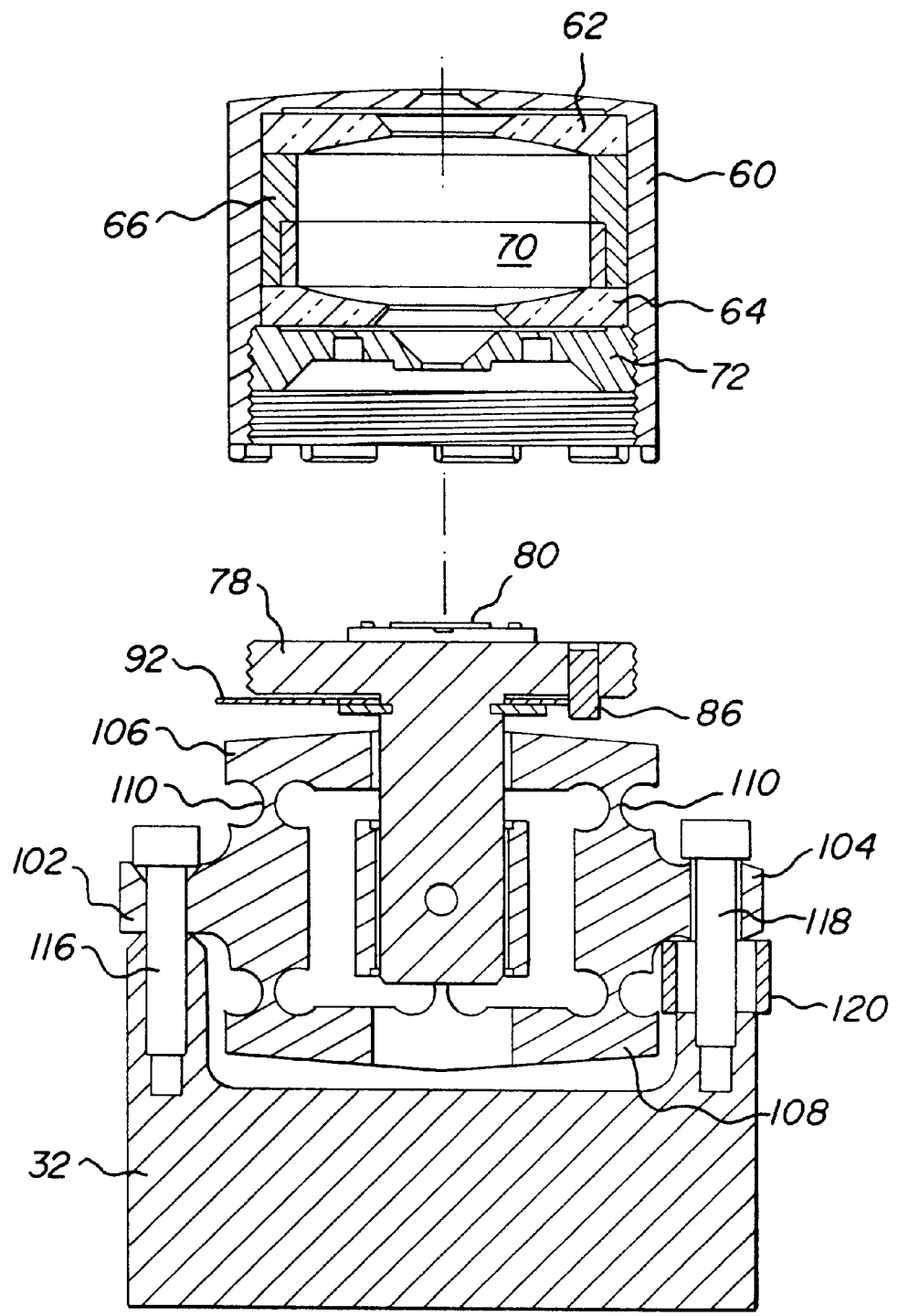
FIG. 5 is an assembly view in section of the lens adjustment assembly of FIG. 4.

Referring to FIGS. 4 and 5, lens assembly 31 includes a cover 60 that receives an upper mirror 62 and a lower mirror 64 separated by a mirror spacer 66. The spacer carries a diaphragm 68 and a diaphragm spacer 70. This cover subassembly is held together by a jam nut 72.

An array post 76 has a threaded head 78 with four locating pins that are received in mating holes of an LED array 80. The array may be secured to the post head by screws. A cover lock 82 is secured on post 76 by an E-ring 84. Rotation of cover lock 82 is limited by a pin 86 depending from head 78 into a slot 88 in the cover lock.

The cover subassembly is screwed onto threaded head 78 of array post 76. When jam nut 72 bottoms out on threaded head 78, a tab 92 on cover lock 82 falls into one of several castellations 94 around the bottom of cover 60.

A lens adjustment block 100 includes three arms 102–104 connected to top and bottom links 106 and 108, respectively, by narrow webs 110 to form a pantograph linkage. Vertical movement of arm 104 relative to arm 102 by a given distance will cause central arm 103 to move relative to arm 102 half the given distance that arm 104 moved. Lens adjustment block 100 is preferably extrusion-formed as a single unit because an extrusion is light weight and requires little machining compared to sheet metal fabrication.

During assembly, array post 76 is inserted through a hole 112 in top link 106 and is received by "v" shaped walls in central arm 103, where it is secured by a screw 114. Adjustment block 100 is attached to rotor 32 by a screw 116. A lens adjustment screw 118 compresses a spring 120. As best seen in FIG. 5, the lens assembly can be focused by merely turning lens adjustment screw 118 to raise or lower arm 104 relative to rotor 32. Central arm 103 follows arm 104, moving one half the distance of arm 104.

Accordingly, very fine adjustment can be easily effected, both in the factory during final assembly and in the field. The improved lens adjustment assembly is light in weight and low in inertia so that the rotor motor requirements are small, large size component use is minimized, and the rotor reaches operating speed in less time; yet the lens adjustment assembly is sufficiently rigid to maintain focus at speed.

As can best be seen in FIG. 5, The cover subassembly including cover 60, mirrors 62 and 64, diaphragm 68, and jam nut 72 can be removed as an assembled unit from array post 76 so that LED array 80 can be reached for replacement without unduly affecting lens focal length adjustment during LED array replacement.

The invention has been described in detail with particular reference to preferred embodiments thereof, but it will be understood that variations and modifications can be effected within the spirit and scope of the invention.

What is claimed:

1. An electronic digital imaging apparatus comprising:

an intensity-modulated light source for emitting a light beam along an optical path;

an adjustment block to which the light source is fixed, said adjustment block being movable along the optical path to move the light source along the optical path, the adjustment block having two opposed ends and a central region, one of the opposed ends being fixed relative to the optical path, another of the opposed ends being adjustable in a direction parallel to the optical path, the central region carrying the light source, whereby adjustment of said another of the opposed ends in the direction parallel to the optical path by a given distance is effective to move the light source along the optical path by a fraction of the given distance; and means for scanning the light beam along a recording surface.

2. An electronic digital imaging apparatus as set forth in claim 1 wherein the light source is carried by the central region of the adjustment block approximately midway between the two opposed ends, whereby adjustment of said another of the opposed ends in the direction parallel to the optical path by the given distance is effective to move the light source along the optical path by approximately one-half of the given distance.

3. An electronic digital imaging apparatus as set forth in claim 1 wherein the adjustment block is a pantograph linkage comprising:

a first arm forming said one of the opposed ends of the adjustment block;

a second arm forming said another of the opposed ends of the adjustment block, and a third arm forming said central region of the adjustment block, said three arms being flexibly connected to a top link and a bottom link, whereby adjustment of said second arm in the direction generally parallel to the optical path by a given distance is effective to move the third arm along the optical path by a fraction of the given distance.

4. An electronic digital imaging apparatus as set forth in claim 1 wherein the adjustment block is an extrusion formed as a single unit.

5. An electronic digital imaging apparatus as set forth in claim 1 further comprising projection optics detachably integral with the light source in the optical path for focusing the imaging apparatus such that the light beam is focused at the recording surface, said projection optics being detachable from the light source without effecting the position of the light source along the optical path so as to not disturb the focus of the imaging apparatus upon re-attachment of the projection optics to the light source.

6. A printer comprising:

a support adapted to receive and hold photosensitive media in a cylindrical shape;

a write head assembly including a light source for emitting a light beam along an optical path and means for adjusting the position of the light source toward and away from received photosensitive media to adjust focus onto the received print media, the adjustment block having two opposed ends and a central region, one of the opposed ends being fixed, another of the opposed ends being adjustable in a direction parallel to the optical path and generally toward the received photosensitive media, the central region carrying the light source, whereby adjustment of said other of the opposed ends in the direction toward the received photosensitive media by a given distance is effective to move the light source in the direction generally toward the received photosensitive media by a fraction of the given distance; and means for scanning the light source along the cylindrical shape of received print media.

7. A printer as set forth in claim 6 wherein the adjusting means comprises an adjustment block to which the light source is fixed and which is movable to move the light source toward and away from received photosensitive media.

8. A printer as set forth in claim 7 wherein the light source is carried by a central region of the adjustment block approximately midway between two opposed ends of the adjustment block, whereby adjustment of said another of the opposed ends in a direction toward the received photosensitive media by a given distance is effective to move the light source in the direction generally toward the received photosensitive media by approximately one-half of the given distance.

9. A printer as set forth in claim 7 wherein the adjustment block is a pantograph linkage comprising:

a first arm forming one opposed end of the adjustment block;

a second arm forming another opposed end of the adjustment block, and a third arm forming a central region of the adjustment block, said three arms being flexibly connected to a top link and a bottom link, whereby adjustment of said second arm in a direction generally toward the received photosensitive media by a given distance is effective to move the third arm in the direction generally toward the received photosensitive media by a fraction of the given distance.

10. A printer as set forth in claim 7 wherein the adjustment block is an extrusion formed as a single unit.

11. A printer as set forth in claim 6 further comprising projection optics detachably and re-attachably integral with the light source for focusing the imaging apparatus such that the light beam is focused at the recording surface, said projection optics being detachable from the light source without effecting the position of the light source in a direction generally towards the received photosensitive media so as to not disturb the focus of the imaging apparatus upon re-attachment of the projection optics to the light source.

12. A printer as set forth in claim 6 wherein the scanning means includes a rotor that is mounted for simultaneous rotation within, and linear translation along the axis of, the cylindrical shape of received media, said write head assembly being mounted on the rotor.

13. A printer as set forth in claim 6 further comprising projection optics adapted to focus light from the source onto the inner cylindrical surface of received media.

* * * * *